United States Patent
Asao et al.

(10) Patent No.: US 6,757,045 B1
(45) Date of Patent: Jun. 29, 2004

(54) LIQUID CRYSTAL DEVICE AND LIQUID CRYSTAL APPARATUS INCLUDING SAME

(75) Inventors: Yasufumi Asao, Atsugi (JP); Masahiro Terada, Hadano (JP); Takeshi Togano, Chigasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/532,078

(22) Filed: Mar. 21, 2000

(30) Foreign Application Priority Data

Mar. 23, 1999 (JP) ............................................ 11-078503
Mar. 23, 1999 (JP) ............................................ 11-078504

(51) Int. Cl.$^7$ ............................ G02F 1/141; G02F 1/13; G02F 1/1337
(52) U.S. Cl. ........................ 349/172; 349/134; 349/184; 349/191
(58) Field of Search ................................ 349/172, 134, 349/191, 184, 96, 171

(56) References Cited

U.S. PATENT DOCUMENTS

| | | | |
|---|---|---|---|
| 5,458,804 A | | 10/1995 | Yamada et al. ........ 252/299.01 |
| 5,583,680 A | * | 12/1996 | Nakamura et al. |
| 5,629,788 A | | 5/1997 | Mori et al. ................. 249/172 |
| 5,786,879 A | * | 7/1998 | Kodera et al. |
| 5,822,031 A | * | 10/1998 | Kodera et al. |
| 5,932,136 A | | 8/1999 | Terada et al. .......... 252/299.01 |
| 6,061,045 A | * | 5/2000 | Inaba |
| 6,310,677 B1 | * | 10/2001 | Togano et al. |

FOREIGN PATENT DOCUMENTS

JP 11-311812 11/1999

* cited by examiner

Primary Examiner—Julie Ngo
(74) Attorney, Agent, or Firm—Fitzpatrick, Cella, Harper & Scinto

(57) ABSTRACT

A liquid crystal device is constituted by a layer of a chiral smectic liquid crystal, a pair of substrates oppositely disposed to sandwich the liquid crystal and each provided with an electrode for applying a voltage to the liquid crystal, at least one of the substrates being provided with a uniaxial aligning axis for aligning the liquid crystal, and a polarizer disposed on at least one of the substrates. The liquid crystal has an alignment characteristic such that it is aligned to provide an average molecular axis to be placed in a monostable alignment state under no voltage application, is tilted from the monostable alignment state in one direction when supplied with a voltage of a first polarity at a tilting angle which varies depending on magnitude of the supplied voltage, and is tilted from the monostable alignment state in the other direction when supplied with a voltage of a second polarity opposite to the first polarity at a tilting angle, said tilting angles providing maximum tilting angles $\beta 1$ and $\beta 2$ formed under application of the voltages of the first and second polarities, respectively, satisfying $\beta 1 > \beta 2$ or $\beta 1 = \beta 2$. The liquid crystal layer in the liquid crystal device is set to have a refractive index anisotropy and a layer thickness giving a retardation under voltage application which is in an optimum retardation range determined based on an arrangement of the polarizer and a wavelength of light passing through the liquid crystal layer, thus improving a resultant transmittance.

12 Claims, 5 Drawing Sheets

Figure 1:
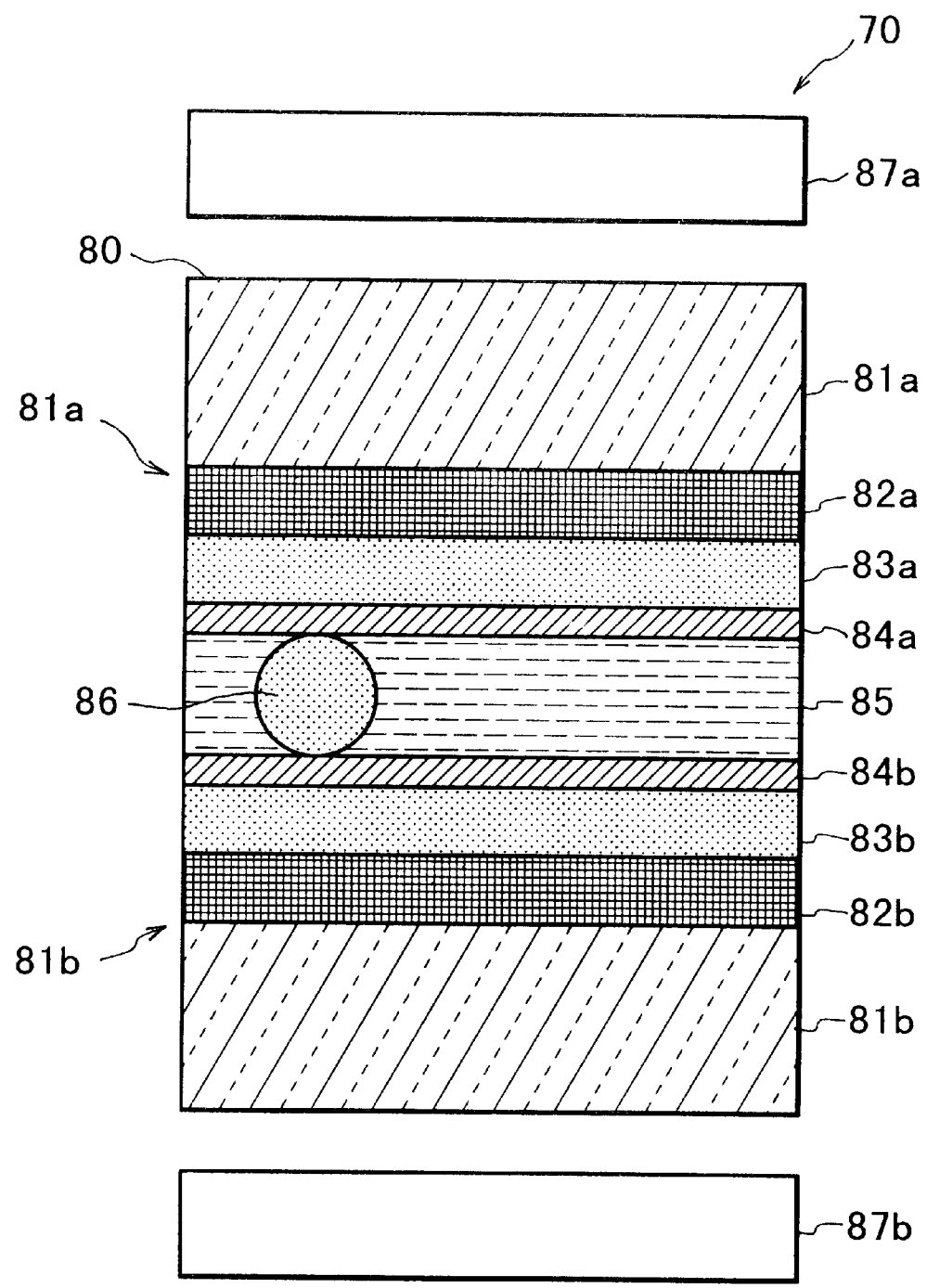

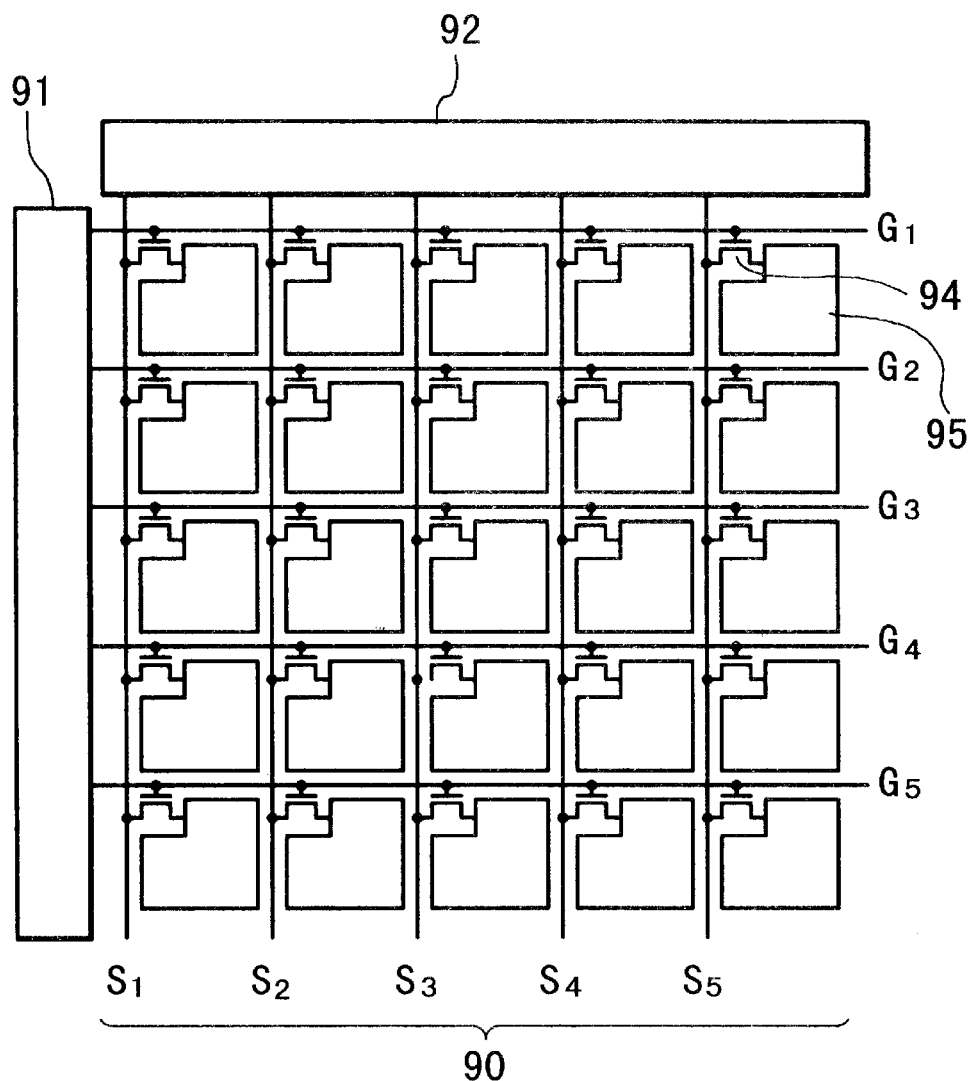
F I G. 2

LIQUID CRYSTAL DEVICE AND LIQUID CRYSTAL APPARATUS INCLUDING SAME

BACKGROUND OF THE INVENTION

The present invention relates to a liquid crystal device and a liquid crystal apparatus, such as a liquid crystal display apparatus, including the liquid crystal device for use in light valves for flat-panel displays, projection displays, printers, etc., and particularly relates to those using a chiral smectic liquid crystal.

Active matrix-type liquid crystal devices wherein each pixel is provided with an active element (e.g., a thin film transistor (TFT)) are known as a type of a nematic liquid crystal display device.

Twisted nematic (TN) liquid crystal, as disclosed by M. Schadt and W. Helfrich, Appl. Phys. Lett., vol. 18, no. 4, pp. 127–128 (1971), has been used as a nematic liquid crystal material used for such an active matrix-type liquid crystal device using a TFT.

In recent years, liquid crystal devices of both In-Plain Switching mode, utilizing an electric field applied in a longitudinal direction of the device, and Vertical Alignment mode have been proposed to improve a viewing angle characteristic which is poor in conventional liquid crystal displays.

Accordingly, there are various liquid crystal modes suitable for the TFT-type liquid crystal device using the nematic liquid crystal material. In any mode, however, the resultant nematic liquid crystal display device has encounters a problematic slow response speed of several ten milliseconds or more.

In order to improve the response characteristic of the conventional types of nematic liquid crystal devices, several liquid crystal devices using a specific chiral smectic liquid crystal, such as a ferroelectric liquid crystal of a short pitch-type, a polymer-stabilized ferroelectric liquid crystal or an anti-ferroelectric liquid crystal showing no threshold (voltage) value, have been proposed. Although these devices have not been put into practical use sufficiently, it has been reported that a high speed responsiveness on the order of below millisecond is realized.

With respect to the chiral smectic liquid crystal device, our research group has proposed a liquid crystal device as in U.S. patent application Ser. No. 09/338426 (filed Jun. 23, 1999), wherein a chiral smectic liquid crystal has a phase transition series on temperature decrease of isotropic liquid phase (Iso)—cholesteric phase (Ch)—chiral smectic C phase (SmC*) or Iso—SmC*, and liquid crystal molecules are monostabilized at a position inside an edge of a virtual cone. During the phase transition of Ch—SmC* or Iso—SmC*, liquid crystal molecular layers are uniformly oriented or aligned in one direction, e.g., by applying a DC voltage of one polarity (+ or −) between a pair of substrates to improve high speed responsiveness and gradation control performance and realize a high luminance liquid crystal device excellent in motion picture image qualities with a high mass productivity.

Further, our search group has also proposed a chiral smectic liquid crystal device as in U.S. patent application Ser. No. 09/257032 (filed Feb. 25, 1999; corresponding to Japanese Laid-Open Patent Application (JP-A) 11-311812), wherein a chiral smectic liquid crystal is placed in an alignment state in chiral smectic C phase such that the liquid crystal comprises smectic molecular layers forming a chevron structure, under no electric field application, the liquid crystal has an average molecular axis substantially in alignment with the uniaxial alignment axis and/or a bisector of a maximum angle formed between two extreme molecular axes established under electric field application, and under electric field application, the liquid crystal provides an effective tilt angle and a transmittance that continuously changed depending on an electric field applied thereto. The smectic molecular layers provide a layer inclination angle $\delta$ with respect to a normal to the substrates, and the liquid crystal provides a tilt angle H in chiral smectic C phase satisfying the following relationship at at least an operating temperature: $\delta \geq H$.

The above-mentioned ferroelectric or anti-ferroelectric liquid crystals effecting inversion switching based on spontaneous polarization are liquid crystal materials showing chiral smectic phase.

Accordingly, in a sense of solving the problem of the conventional nematic liquid crystal devices, i.e., improvement in response speed, the realization of a practical liquid crystal device using a chiral smectic liquid crystal material is expected for use in advanced displays with high speed responsiveness and high gradation display performance.

In this regard, however, optimum conditions for designing such a liquid crystal device, particularly a cell gap or thickness, have not yet been sufficiently proposed.

In the case of, e.g., a liquid crystal device using a surface-stabilized ferroelectric liquid crystal (SSFLC) assuming only two (bright and dark) states, when liquid crystal molecules are aligned in parallel with a pair of substrates, it is possible to obtain a transmitted light quantity in a light-transmission state (white display state) based on a product ($\Delta n d$) of a refractive index anisotropy (birefringence) ($\Delta n = n_{//} - n_\perp$) inherent to the liquid crystal material used and a cell gap (d).

Specifically, under the cross-nicol condition, a transmitted light quantity T1 may be calculated according to the following equation (A):

$$T1 = \sin^2(\pi \Delta n d / \lambda) \tag{A}$$

wherein $\lambda$ denotes a wavelength of incident light.

By using the equation (A), the cell gap (d) may appropriately be determined so as to provide a desired waveform-transmittance characteristic, thus optimizing the liquid crystal device.

In the case of using a SSFLC providing a large (high) pretilt angle, it is possible to calculate an effective refractive index anisotropy ($\Delta n_{effect}$) within a liquid crystal device by taking an angle of liquid crystal molecules rising from a planar (horizontal) surface of the substrate into consideration. By using the effective refractive index anisotropy ($\Delta n_{effect}$) in place of $\Delta n$ in the above equation (A), it is similarly possible to readily obtain an optimum cell gap for the liquid crystal device using the SSFLC providing the large tilt angle.

However, as a result of our detailed study, when a liquid crystal device using a monostabilized FLC (ferroelectric liquid crystal) according to the above-mentioned earlier-filed U.S. patent application Ser. Nos. 09/338426 and 09/257032 is prepared based on the above-mentioned cell gap designing, a transmittance at the time of actual drive of the liquid crystal device results in a value different from the calculated value based on the equation (A), although the FLC material is used. In other words, it has been experimentally confirmed that the light-transmission characteristic of the SSFLC (showing bistability) and that of the monostabilized FLC as used in the earlier-filed U.S. patent applications are different in behavior from each other.

More specifically, when a liquid crystal device providing no pretilt angle is prepared according to the earlier-filed U.S. patent applications and its cell gap is set to optimize a value Δnd based on the above-described equation (A), the resultant transmitted light quantity is lower in intensity than the calculated (expected) transmitted light quantity (obtained according to the equation (A)). Further, a color temperature for white is shifted to a higher temperature side, thus resulting in a peak wavelength shifted toward a shorter wavelength side.

SUMMARY OF THE INVENTION

In view of the above-mentioned problems, an object of the present invention is to provide a liquid crystal device capable of providing a high transmittance state even in the case of using a liquid crystal material assuming a chiral smectic phase.

Another object of the present invention is to provide a liquid crystal apparatus including the liquid crystal device.

According to the present invention, there is provided a liquid crystal device comprising a layer of a chiral smectic liquid crystal, a pair of substrates oppositely disposed to sandwich the liquid crystal and each provided with an electrode for applying a voltage to the liquid crystal, at least one of the substrates being provided with a uniaxial aligning axis for aligning the liquid crystal, and a polarizer disposed on at least one of the substrates, wherein the liquid crystal has an alignment characteristic such that the liquid crystal is aligned to provide an average molecular axis to be placed in a monostable alignment state under no voltage application, is tilted from the monostable alignment state in one direction when supplied with a voltage of a first polarity at a tilting angle which varies depending on the magnitude of the supplied voltage, and is tilted from the monostable alignment state in the other direction when supplied with a voltage of a second polarity opposite to the first polarity at a tilting angle, said tilting angles providing maximum tilting angles β1 and β2 formed under application of the voltages of the first and second polarities, respectively, satisfying β1>β2, and the liquid crystal layer in the liquid crystal device is set to have a refractive index anisotropy and a layer thickness giving a retardation under voltage application which is in an optimum retardation range determined based on an arrangement of the polarizer and a wavelength of light passing through the liquid crystal layer.

According to the present invention, there is also provided a liquid crystal device comprising a layer of a chiral smectic liquid crystal, a pair of substrates oppositely disposed to sandwich the liquid crystal and each provided with an electrode for applying a voltage to the liquid crystal, at least one of the substrates being provided with a uniaxial aligning axis for aligning the liquid crystal, and a polarizer disposed on at least one of the substrates, wherein the liquid crystal has an alignment characteristic such that the liquid crystal is aligned to provide an average molecular axis to be placed in a monostable alignment state under no voltage application, is tilted from the monostable alignment state in one direction when supplied with a voltage of a first polarity at a tilting angle which varies depending on the magnitude of the supplied voltage, and is tilted from the monostable alignment state in the other direction when supplied with a voltage of a second polarity opposite to the first polarity at a tilting angle, said tilting angles providing maximum tilting angles β1 and β2 formed under application of the voltages of the first and second polarities, respectively, satisfying β1=β2, and the liquid crystal layer in the liquid crystal device is set to have a refractive index anisotropy and a layer thickness giving a retardation under voltage application which is in an optimum retardation range determined based on an arrangement of the polarizer and a wavelength of light passing through the liquid crystal layer.

According to the present invention, there is further provided a transmission-type liquid crystal apparatus comprising either one of the above-mentioned liquid crystal devices, a drive circuit for driving the liquid crystal device, and a backlight as a light source.

According to the present invention, there is still further provided a reflection-type liquid crystal apparatus comprising either one of the above-mentioned liquid crystal devices, a drive circuit for driving the liquid crystal device, and a reflection plate.

DESCRIPTION OF THE PREFERRED EMBODIMENTS

Hereinbelow, an embodiment of the liquid crystal device according to the present invention will be described with reference to FIG. 1.

FIG. 1 shows a schematic sectional view of a liquid crystal device 70 constituting the liquid crystal apparatus according to the present invention.

Referring to FIG. 1, the liquid crystal device 70 includes a liquid crystal cell structure 80 and a pair of cross-nicol polarizers 87a and 87b (wherein two polarizing axes intersect each other at right angles) disposed outside the liquid crystal cell structure 80.

The liquid crystal cell structure 80 includes a pair of substrates 81a and 81b; electrodes 82a and 82b disposed on the substrates 81a and 81b, respectively; insulating films 83a and 83b disposed on the electrodes 82a and 82b, respectively; alignment control films 84a and 84b disposed on the insulating films 83a and 83b, respectively; a liquid crystal 85 disposed between the alignment control films 84a and 84b; and a spacer 86 disposed together with the liquid crystal 85 between the alignment control films 84a and 84b.

The liquid crystal 85 may preferably assume chiral smectic phase.

Each of the substrates 81a and 81b comprises a transparent material, such as glass or plastic, and is coated with, e.g., a plurality of stripe electrodes 82a (82b) of $In_2O_3$ or ITO (indium tin oxide) for applying a voltage to the liquid crystal 85. These electrodes 82b and 82b intersect each other to form a matrix electrode structure, thus providing a simple matrix-type liquid crystal device. As a modification of the electrode structure, one of the substrates 81a and 81b may be provided with a matrix electrode structure wherein dot-shaped transparent electrodes are disposed in a matrix form, and each of the transparent electrodes is connected to a switching element, such as a TFT (thin film transistor) or MIM (metal-insulator-metal), and the other substrate may be provided with a counter (common) electrode on its entire surface or in a prescribed pattern, thus constituting an active matrix-type liquid crystal device.

On the electrodes 82a and 82b, the insulating films 83a and 83b, e.g., of $SiO_2$, $TiO_2$ or $Ta_2O_5$, having a function of preventing an occurrence of short circuit, may be disposed, respectively, as desired.

On the insulating films 83a and 83b, the alignment control films 84a and 84b are disposed so as to control the alignment state of the liquid crystal 85 contacting the alignment control films 84a and 84b. At least one of (preferably both of) the alignment control films 84a and 84b is subjected to a uniaxial aligning treatment (e.g., rubbing). Such an alignment control film 84a (84b) may be prepared by forming a film of an organic material (such as polyimide, polyimideamide, polyamide or polyvinyl alcohol) through wet coating with a solvent, followed by drying and rubbing in a prescribed direction or by forming a deposited film of an inorganic material through an oblique vapor deposition such that an oxide (e.g., SiO) or a nitride is vapor-deposited onto a substrate in an oblique direction with a prescribed angle to the substrate.

The alignment control films 84a and 84b may appropriately be controlled to provide liquid crystal molecules of the liquid crystal 85 with a prescribed pretilt angle (an angle formed between the liquid crystal molecule and the alignment control film surface at the boundaries with the alignment control films) by changing the material and treating conditions (of the uniaxial aligning treatment).

In the case where both of the alignment control films 84a and 84b are subjected to the uniaxial aligning treatment (rubbing), the respective uniaxial aligning treatment (rubbing) directions may appropriately be set in a parallel relationship, an anti-parallel relationship or a crossed relationship providing a crossing angle of at most 45 degrees, depending on the liquid crystal material used.

The substrates 81a and 81b are disposed opposite to each other via the spacer 86 comprising e.g., silica beads, for determining a distance (i.e., cell gap) therebetween, preferably in the range of 0.3–10 μm, in order to provide a uniform uniaxial aligning performance and such an alignment state that an average molecular axis of the liquid crystal molecules under no electric field application is substantially aligned with an average uniaxial aligning treatment axis (a bisector of two uniaxial aligning treatment axes), although the cell gap varies its optimum range and its upper limit depending on the liquid crystal material used. The cell gap may preferably be appropriately set to provide a retardation under no voltage application described hereinafter.

In addition to the spacer 86, it is also possible to disperse adhesive particles of a resin (e.g., epoxy resin) (not shown) between the substrates 81a and 81b in order to improve adhesiveness therebetween and an impact (shock) resistance of the liquid crystal having a chiral smectic phase.

A liquid crystal device 70 having the above-mentioned liquid crystal cell structure 80 can be prepared by using a liquid crystal material 85 exhibiting a chiral smectic phase, while adjusting the composition thereof, and further by appropriate adjustment of the liquid crystal material treatment, the device structure including a material and a treatment condition for alignment control films 84a and 84b. More specifically, as a result, the liquid crystal material is placed in an alignment state such that the liquid crystal molecules are aligned to provide an average molecular axis to be mono-stabilized in the absence of an electric field applied thereto and, under application of voltages of one polarity (a first polarity), are realigned to provide a tilting angle which varies continuously from the average molecular axis of the monostabilized position depending on the magnitude of the applied voltage. On the other hand, under application of voltages of the other polarity (i.e., a second polarity opposite to the first polarity), the liquid crystal molecules are tilted from the average molecular axis under no electric field depending on the magnitude of the applied voltages. Further, in this embodiment a maximum tilting angle β1 obtained under application of the first polarity voltages is substantially larger than a maximum tilting angle β2 formed under application of the first polarity voltages, i.e., β1>β2, more preferably β1≧5×β2. The liquid crystal material showing a chiral smectic phase may preferably exhibit a phase transition series on temperature decrease of Iso (isotropic phase)—Ch (cholesteric phase)—SmC* (chiral smectic C phase) or Iso—SmC*.

In the liquid crystal device 70, when one polarity (positive (+) or negative (−)) DC voltage is applied between the pair of substrates during the phase transition to SmC*, liquid crystal molecules in SmC* are placed in a state providing only either one of the first and second domains D1 and D2 giving different layer normal directions to provide a certain angle formed between an average uniaxial aligning axis and the resultant smectic layer normal direction. Further, under no voltage application, liquid crystal molecules are stabilized inside a virtual cone edge for the liquid crystal molecules, thus being placed in a SmC* alignment state wherein a memory characteristic is not developed (i.e., a non-memory state).

The liquid crystal material 85 showing chiral smectic phase may preferably have a helical pitch which is at least twice a cell gap in a bulk state thereof The liquid crystal material 85 showing chiral smectic phase may preferably be a composition prepared by appropriately blending a plurality of liquid crystal materials exhibiting, e.g., the above-described characteristics (in terms of a cone angle inherent to a liquid crystal material used, a smectic layer spacing and a layer inclination angle) selected from hydrocarbon-type liquid crystal materials containing a biphenyl, phenyl-cyclohexane ester or phenyl-pyrimidine skeleton; naphthalene-type liquid crystal materials; and fluorine-containing liquid crystal materials.

The liquid crystal composition as the liquid crystal 85 used in the liquid crystal device 70 may preferably comprise at least two compounds each represented by the following formulas (1), (2), (3) and (4).

Formula (1)

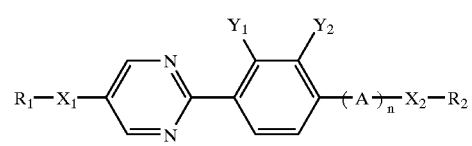

wherein

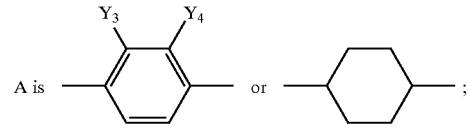

A is

R1 and R2 are independently a linear or branched alkyl group having 1–2 carbon atoms optionally having a substituent; X1 and X2 are independently a single bond O, COO or OOC; Y1, Y2, Y3 and Y4 are independently H or F; and n is 0 or 1.

Formula (2)

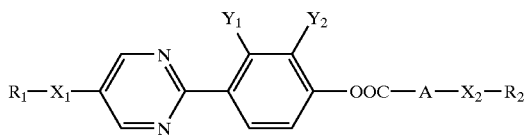

wherein

A is 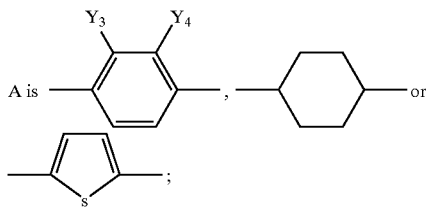

R1 and R2 are independently a linear or branched alkyl group having 1–20 carbon atoms optionally having a substituent; X1 and X2 are independently a single bond O, COO or OOC; and Y1, Y2, Y3 and Y4 are independently H or F.

Formula (3)

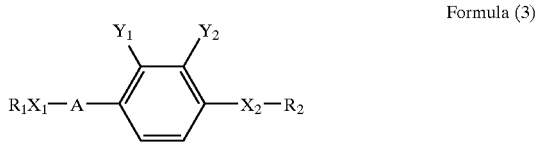

wherein A:

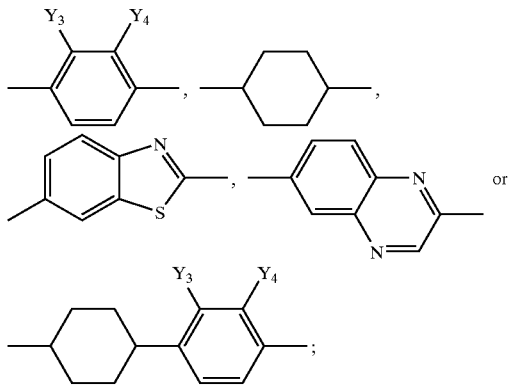

R1 and R2 are independently a linear or branched alkyl group having 1–20 carbon atoms optionally having a substituent X1 and X2 are independently a single bond O, COO or OOC; and Y1, Y2, Y3 and Y4 are independently H or F.

Formula (4)

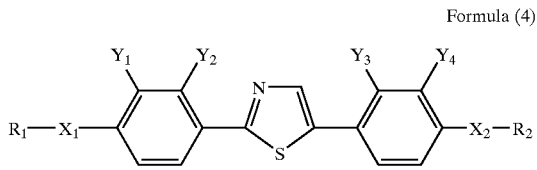

wherein R1 and R2 are independently a linear or branched alkyl group having 1–2 carbon atoms optionally having a substituent; X1 and X2 are independently a single bond, O, COO or OOC; and Y1, Y2, Y3 and Y4 are independently H or F.

In the present invention, by using the above-mentioned liquid crystal device 70 as shown in FIG. 1 in combination with a drive circuit for supplying gradation signals to the liquid crystal device, it is possible to provide a liquid crystal display apparatus capable of effecting a gradational display based on the above-mentioned alignment characteristic such that under voltage application, a resultant tilting angle varies continuously from the monostabilized position of the average molecular axis (of liquid crystal molecules) and a corresponding emitting light quantity continuously changes, depending on the applied voltage.

For example, it is possible to use, as one of the pair of substrates, an active matrix substrate provided with a plurality of switching elements (e.g., TFT (thin film transistor) or MIM (metal-insulator-metal)) in combination with a drive circuit (drive means), thus effecting an active matrix drive based on amplitude modulation to allow a gradational display in an analog-like gradation manner.

Hereinbelow, an embodiment of a liquid crystal display apparatus of the present invention including a liquid crystal device provided with such an active matrix substrate will be explained with reference to FIGS. 2–4.

FIG. 2 shows a schematic plan view of such a display apparatus including a liquid crystal device and a drive circuit (means) and principally illustrates a structure on the active matrix substrate side.

Referring to FIG. 2, a liquid crystal device (panel) 90 includes a structure such that gate lines (G1, G2, G3, G4, G5, . . . ) corresponding to scanning lines connected to a scanning signal driver 91 (drive means) and source lines (S1, S2, S3, S4, S5, . . . ) corresponding to data signal lines connected to a data signal driver 92 (drive means) are disposed to intersect each other at right angles in an electrically isolated state, thus forming a plurality of pixels (5×5 in FIG. 2), each at an intersection thereof. Each pixel is provided with a thin film transistor (TFT) 94 as a switching element and a pixel electrode 95 (as an effective drive region). The switching element may be a metal-insulator-metal (MIM) element. The gate lines (G1, G2, . . . ) are connected with gate electrodes (not shown) of the TFT 94, respectively, and the source lines (S1, S2, . . . ) are connected with source electrodes (not shown) of the TFT 94, respectively. The pixel electrodes 95 are connected with drain electrodes (not shown) of the TFT 94, respectively.

A gate voltage is supplied to the gate lines (G1, G2, . . . ) from the scanning signal driver 91 by effecting scanning selection in, e.g., a line-sequential manner. In synchronism with this scanning selection on the gate lines, the source lines (S1, S2, . . . ) are supplied with a data signal voltage depending on writing data for each pixel from the data signal driver 92. The thus-supplied gate and data signal voltages are applied to each pixel electrode 95 via the TFT 94.

Figure 3:
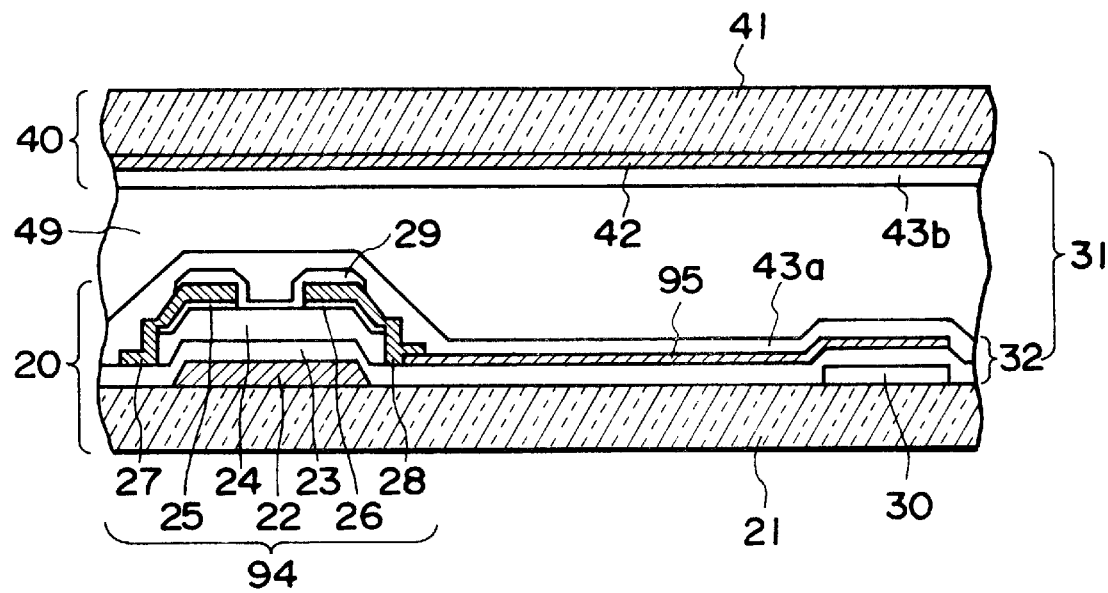

FIG. 3 shows a sectional structure of each pixel portion (corr. to 1 bit) in the panel structure shown in FIG. 2.

Referring to FIG. 3, a layer of a liquid crystal material 49 having a spontaneous polarization is sandwiched between an active matrix substrate or plate 20 provided with a TFT 94 and a pixel electrode 95 and an opposing substrate or plate 40 provided with a common electrode 42, thus providing a liquid crystal capacitor (Clc) 31 of the liquid crystal layer 49.

In this embodiment, the active matrix substrate 20 includes an amorphous silicon (a-Si) TFT as the TFT 94. The TFT may be of a polycrystalline-Si type, i.e., (p-Si) TFT.

The TFT 94 is formed on a substrate 21 of, e.g., glass, and includes: a gate electrode 22 connected with the gate lines (G1, G2, . . . shown in FIG. 2); an insulating film (gate insulating film) 23 of, e.g., silicon nitride (SiNx), formed on the gate electrode 22; an a-Si layer 24 formed on the insulating film 23; n$^+$a-Si layers 25 and 26 formed on the a-Si layer 24 and spaced apart from each other, a source electrode 27 formed on the n$^+$a-Si layer 25; a drain electrode 28 formed on the n$^+$a-Si layer 26 and spaced apart from the source electrode 27; a channel protective film 29 partially covering the a-Si layer 24 and the source and drain electrodes 27 and 28. The source electrode 27 is connected with the source lines (S1, S2, . . . shown in FIG. 2) and the drain electrode 28 is connected with the pixel electrode 95 (FIG. 2) of a transparent conductor film (e.g., ITO film). The TFT 94 is placed in an "ON" state by applying a gate pulse to the gate electrode 22 during a scanning selection period of the corresponding gate line.

Further, on the active matrix substrate 20, a structure constituting a holding or supplementary capacitor (Cs) 32 is formed by the pixel electrode 95, a holding capacitor electrode 30 disposed on the substrate 21, and a portion of the insulating film 23 sandwiched therebetween. The structure (holding capacitor) (Cs) 32 is disposed in parallel with the liquid crystal layer 49. In the case where the holding capacitor electrode 30 has a large area, a resultant aperture or opening rate is decreased. In such a case, the holding capacitor electrode 30 is formed of a transparent conductor film (e.g., ITO film).

On the TFT 94 and the pixel electrode 95 of the active matrix substrate 20, an alignment film 43$a$ for controlling an alignment state of the liquid crystal 49 is provided. The alignment film 43$a$ is subjected to a uniaxial aligning treatment (e.g., rubbing).

On the other hand, the opposing substrate 40 includes: a substrate (e.g., glass substrate) 41; a common electrode 42 having a uniform thickness disposed on the entire substrate 41; and an alignment film 43$b$ having a uniform thickness, disposed on the common electrode 42, for controlling an alignment state of the liquid crystal 49.

Next, an example of an ordinary active matrix driving method utilizing the liquid crystal device having the active matrix substrate (plate) and a chiral smectic liquid crystal having the alignment characteristic as described above will be described with reference to FIGS. 4 and 5 in combination with FIGS. 2 and 3.

Figure 4:
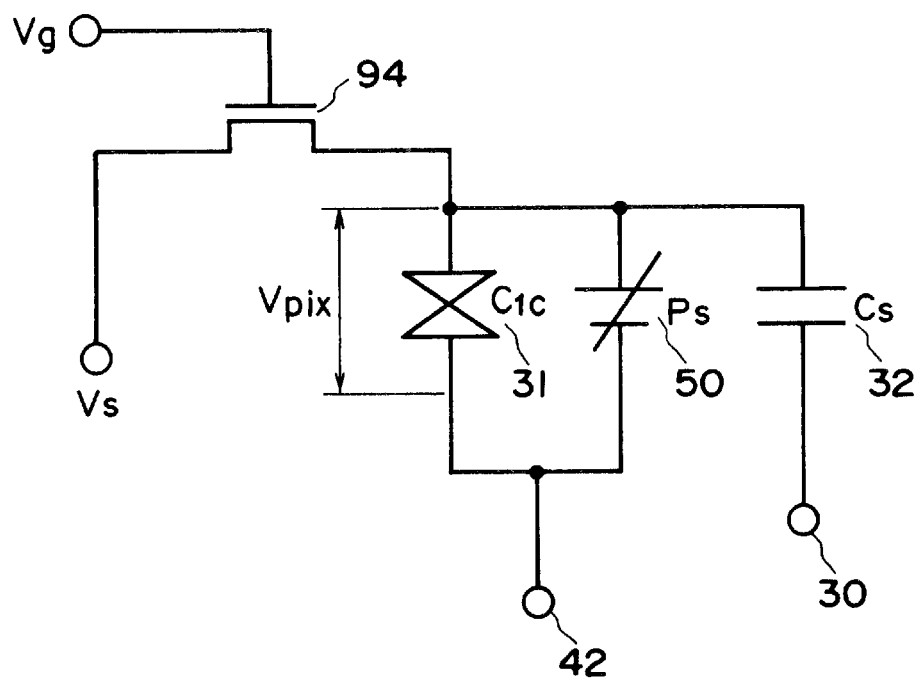

FIG. 4 shows an example of an equivalent circuit for each pixel portion of such a liquid crystal device shown in FIG. 3.

Figure 5:
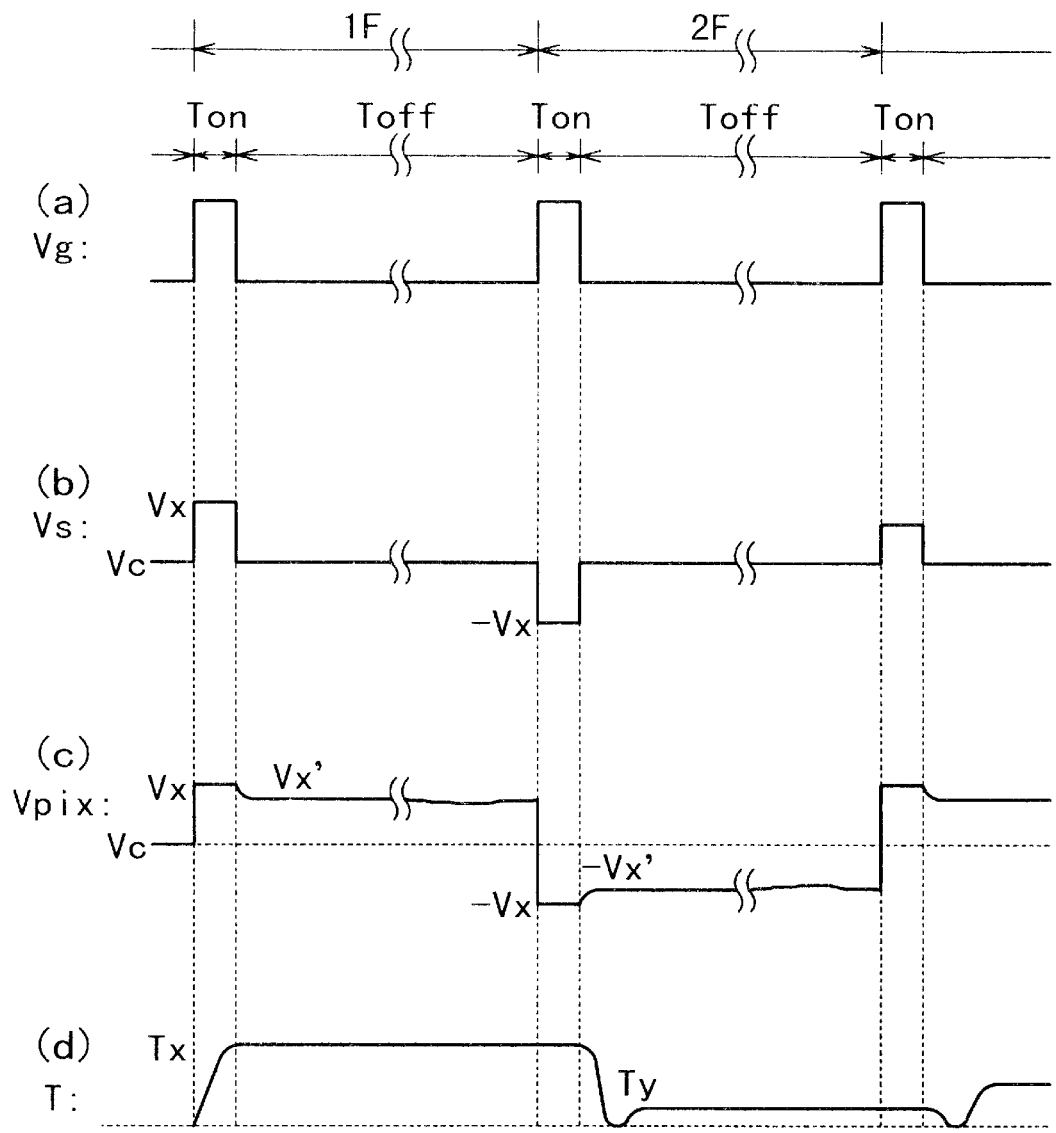

In the active matrix driving method used in the present invention described below, as shown in FIG. 5, for each pixel, one frame period for displaying prescribed information (e.g., a full-color image) is divided into a plurality of field periods 1F, 2F, . . . , each for a prescribed image.

In each of the field periods 1F and 2F, a prescribed emitting liquid quantity depending on prescribed image information for each field period is obtained. Further, in each frame period, an average of the emitting light quantities in the field periods 1F and 2F is obtained to provide a prescribed image.

Hereinbelow, an active matrix driving method using a frame period divided into two field periods and a liquid crystal material having an alignment characteristic such that liquid crystal molecules are aligned or oriented to provide sufficient transmitted light intensities under application of one polarity voltage and weaker transmitted light intensities under application of the other polarity voltage will be described.

FIG. 5 shows at (a) a voltage waveform applied to one gate line (e.g., G1 shown in FIG. 2) (as a scanning line) connected with each pixel.

In the liquid crystal device driven by the active matrix driving method, the gate lines G1, G2 . . . shown in FIG. 2 are selected in a line-sequential manner in each of the field periods 1F and 2F. At this time, each gate electrode 22 connected with a corresponding gate line is supplied with a prescribed gate voltage Vg in a selection period $T_{on}$ of each field period (e.g., 1F), thus placing the TFT 94 in an "ON" state. In a non-selection period $T_{off}$ (of, e.g., the field period 1F) corresponding to a period in which other gate lines are selected, the gate electrode 22 is not supplied with the gate voltage Vg, thus placing the TFT 94 in an "OFF" state (high-resistance state). In every non-selection period $T_{off}$ a prescribed gate line is selected and a corresponding gate electrode 22 is supplied with the gate voltage Vg.

FIG. 5 shows at (b) a voltage waveform applied to one source line (e.g., S1 shown in FIG. 2) (as a data signal line) connected to the pixel concerned.

When the gate electrode 22 is supplied with the gate voltage Vg in the selection period $T_{on}$ of each field period 1F or 2F as shown at (a) of FIG. 5, in synchronism with this voltage application, a prescribed source voltage (data signal voltage) Vs having a prescribed potential providing a writing data (pulse) to the pixel concerned is applied to a source electrode 27 through the source line connected with the pixel based on a potential Vc of a common electrode 42 as a reference potential.

More specifically, in the first field period 1F constituting one frame period, a positive polarity source voltage Vs having a potential Vx (based on a reference potential Vc) providing a desired optical state or display data (transmittance) based on a voltage-transmittance (V-T) characteristic for the liquid crystal used is applied to the source electrode 27 concerned.

At this time, the TFT 94 is in an "ON" state, whereby the positive polarity source voltage Vx applied to the source electrode 27 is supplied to a pixel electrode 95 via a drain electrode 28, thus charging a liquid crystal capacitor (Clc) 31 and a holding capacitor (Cs) 32. As a result, the potential of the pixel electrode 95 becomes equal to that of the positive polarity source (data signal) voltage Vx.

Then, in a subsequent non-selection period $T_{off}$, for the gate line on the pixel concerned, the TFT 94 is in an "OFF" (high-resistance) state. At this time (in $T_{off}$ of 1F), in the liquid crystal cell, the liquid crystal capacitor (Clc) 31 and the holding capacitor (Cs) 32 retain the electric charges therein, respectively, charged in the selection period $T_{on}$ to keep the (positive polarity) voltage Vx. As a result, the liquid crystal layer 49 of the pixel concerned is supplied with the voltage Vx through the first field period 1F to provide thereat a desired optical state (transmitted light quantity) depending on the voltage Vx.

In the case where the response time of the liquid crystal is larger than the gate "ON" period, a switching of the liquid crystal is effected in the non-selection period $T_{off}$ (the gate "OFF" period) after the completion of the charging of the liquid crystal capacitor (Clc) 32 and the holding capacitor (Cs) 32. In this case, the electrical charges stored in the capacitors are reduced due to inversion of spontaneous polarization to provide (positive polarity) voltage Vx' smaller than the voltage Vx as a pixel voltage Vpix applied to the liquid crystal layer 49 as shown at (c) of FIG. 5.

Thereafter, in the second (subsequent) field period 2F, a negative polarity source voltage Vs (=−Vx) having an identical potential (absolute value) to but a polarity opposite to the source voltage Vs (=Vx) applied in the first field period 1F is applied to the source electrode 27 concerned.

At this time, the TFT 94 is in an "ON" state, whereby the negative polarity source voltage −Vx is supplied to a pixel electrode 95, thus charging a liquid crystal capacitor (Clc) 31 and a holding capacitor (Cs) 32. As a result, the potential of the pixel electrode 95 becomes a level equal to that of the negative polarity source (data signal) voltage −Vx.

Then, in a subsequent non-selection period $T_{off}$, for the gate line on the pixel concerned, the TFT 94 is in an "OFF" (high resistance) state. At this time (in $T_{off}$ of 2F), in the liquid crystal cell, the liquid crystal capacitor (Clc) 31 and the holding capacitor (Cs) 32 retain the electric charges therein, respectively, charged in the selection period $T_{on}$ to keep the (negative polarity) voltage −Vx. As a result, the liquid crystal layer 49 of the pixel concerned is supplied with the voltage −Vx through the second field period 2F to provide thereat a desired optical state (transmitted light quantity) depending on the voltage −Vx.

In the case where the response time of the liquid crystal is larger than the gate "ON" period, a switching of the liquid crystal is effected in the non-selection period Toff (the gate "OFF" period) after the completion of the charging of the liquid crystal capacitor (Clc) 32 and the holding capacitor (Cs) 32. In this case, similarly as in the first period 1F, the electrical charges stored in the capacitors are reduced due to inversion of spontaneous polarization to provide (negative polarity) voltage −Vx' smaller than the voltage −Vx as a pixel voltage Vpix applied to the liquid crystal layer 49 as shown at (c) of FIG. 5.

FIG. 5 shows at (d) an example of an actual optical response (in the case of a liquid crystal device of a transmission-type) at the pixel concerned.

As shown at (c) of FIG. 5, an applied voltage through two field periods 1F and 2F comprises the positive polarity voltage Vx in the first field period 1F and the negative polarity voltage −Vx (having the same amplitude (absolute value) as Vx) in the second field period 2F. In the first field period 1F, as shown at (d) of FIG. 5, a higher luminance or transmitted light quantity Tx is obtained in the first field period 1F, but in the second field period 2F, a lower luminance or transmitted liquid quantity Ty which is closer to zero but a non-zero value is obtained.

As described above, in the active matrix driving method, it becomes possible to effect a good gradational display based on a high speed responsiveness of the chiral smectic liquid crystal. In addition, a gradational display of a pre-scribed level at each pixel is continuously performed by dividing one frame period into a first field pixel 1F providing a higher transmitted light quantity and a second field period 2F providing a lower transmitted light quantity, thus resulting in a timewise aperture rate of at most 50% to improve a human-sensible high speed responsiveness with respect to motion picture display. Further, in the second field period 2F providing the lower transmitted light quantity, the resultant transmitted light quantity is not zero due to a slight switching (inversion) performance of liquid crystal molecules, thus ensuring a certain human-sensible luminance through the entire frame period.

In the above embodiment, the polarity of the voltage (Vx or −Vx) is changed alternately for every field period (1F or 2F) (i.e., polarity inversion for each field period), whereby the voltage actually applied to the liquid crystal layer 49 is continuously changed in an alternating manner to suppress a deterioration of the liquid crystal material used even in a continuous display operation for a long period.

As described above, in the above active matrix driving method, in each frame period consisting of two field periods 1F and 2F, a resultant transmitted light quantity corresponds to an average of Tx and Ty. Accordingly, in order to obtain a further higher transmitted light quantity in each frame period, it is preferred to apply a source (data signal) voltage Vs providing a transmitted light quantity higher than Tx in the first field substrate 1F by a prescribed level.

The liquid crystal device of the present invention may be applicable to a color liquid crystal device by providing one of the substrates 81a and 81b with a color filter comprising color filter segments of at least red (R), green (G) and blue (B).

In the present invention, the liquid crystal device may also be applicable to various liquid crystal devices including: a liquid crystal device of a transmission-type, wherein a pair of transparent substrates 81a and 81b is sandwiched between the pair of polarizers 87a and 87b to optically modulate incident light emitted from a backlight (not shown) as a light source through one of the substrates 81a and 81b to be passed through the other substrate, and a liquid crystal device of a reflection-type, wherein at least one of a pair of substrates 81a and 81b is provided with a polarizer 87a or 87b to optically modulate incident light and reflected light and pass the light through the substrate on the light incident side. The reflection-type liquid crystal device may, e.g., be prepared by providing a reflection plate to either one of the substrates 81a and 8b or forming of a reflective material on one of the substrates per se or a reflecting member provided thereto.

As mentioned hereinabove, the SSFLC showing bistability and the monostabilized FLC allowing the gradation display used in the present invention (similarly as in the earlier-filed U.S. patent applications described above) provide mutually different alignment or light transmission characteristics to each other with respect to liquid crystal molecular alignment state at the time of drive of the liquid crystal devices.

The most different point therebetween may be that the monostabilized FLC continuously (constantly) changes its molecular alignment state in each frame period when a liquid crystal apparatus using the monostabilized FLC for displaying an image comprising a plurality of frames per one second is driven by an AC driving scheme such that a polarity of an applied voltage is changed frame by frame (so-called frame inversion driving scheme).

A liquid crystal apparatus using the SSFLC is not basically required to apply a voltage for retaining a gradation data due to the memory characteristic of the SSFLC. As a result, the AC driving scheme is rarely adopted in the liquid crystal apparatus using the SSFLC.

On the other hand, the monostabilized FLC used in a liquid crystal device capable of having a gradational display performance as in the present invention is essentially driven by using a switching element (e.g., TFT), thus providing varying alignment states depending on a voltage applied to the monostabilized FLC. The TFT-using driving scheme may generally employ an AC voltage because application of a DC voltage to the liquid crystal layer causes a burning or sticking phenomenon due to a localization of impurity ions.

However, different from the case of using the nematic liquid crystal having a response characteristic depending on an effective applied voltage, in the case of using the monostabilized FLC having a spontaneous polarization, an alignment state of liquid crystal molecules changes depending on the polarity of the applied AC voltage. Accordingly, in each frame period, a transient state wherein the alignment state changes is unavoidably included and thus observed as such. In view of a quicker inversion of liquid crystal molecules in a bulk state compared with those at the boundaries with the substrates, it is assumed that a molecular inversion of liquid crystal molecules in such a transient state occurs necessarily via a twisted state of the liquid crystal molecules as a whole.

The twisted state may be conceivable by approximation as follows.

In the monostabilization mode, the liquid crystal molecules at the boundaries with the substrates presumably retain the alignment state typical of when no voltage is applied, even when supplied with a voltage. Assuming that a length of retaining such an alignment state is $\xi$, this value $\xi$ is represented by a function of the applied voltage, i.e., $\xi=\xi(V)$.

Based on symmetry of a liquid crystal device structure, when the applied voltage is zero, $\xi(0)=d/2$ wherein d denotes a thickness of the liquid crystal layer (i.e., cell gap) holds, but the value $\xi$ is decreased with an increasing applied voltage.

Accordingly, when a thickness of an inverted (switching) portion in a bulk state of the liquid crystal layer is taken as $d_{sw}$, the thickness $d_{sw}$ is represented by the following equation (B):

$$d_{sw}=d-2\times\xi(V) \quad (B)$$

In this case, when a liquid crystal device is prepared by aligning either one of polarizing axes of a pair of cross-nicol polarizers with an average molecular alignment (orientation) direction, liquid crystal molecules present within a region defined by the length $\xi$ described above do not contribute to the rotation of the plane of polarization of incident polarized light.

On the other hand, liquid crystal molecules present within a region defined by the thickness $d_{sw}$ of the inverted portion in a bulk state have a higher order than the nematic liquid crystal, since the liquid crystal molecules assume a smectic phase and a resultant smectic liquid crystal device generally has a very small cell thickness of about 1–2 $\mu$m, thus having a sufficient small value of $d_{sw}$. Accordingly, it is conceivable that the liquid crystal molecules as a whole cause switching (inversion) while keeping a uniform alignment state by approximation.

More specifically, based on the approximation, the liquid crystal molecules show inversion behavior such that the length $\xi$ ($=\xi(V)$) of retaining the alignment state typical of when no voltage is applied is decreased with an increasing applied voltage and simultaneously therewith, the liquid crystal molecules are uniformly inserted in the region defined by the thickness $d_{sw}$ to increase a switching angle (an angle formed between average molecular axes under no voltage application and under application of a voltage).

These values are also a function of time as well as of voltage since the above inversion behavior is a phenomenon of transient response of the liquid crystal molecules.

When the switching angle in the region defined by $d_{sw}$ is taken as $\psi$, an instantaneous transmittance T3 at a time t is represented by the following equation (C):

$$T3=\sin^2(2\psi)\times\sin^2(R3/\lambda) \quad (C),$$

wherein R3 denotes a transient retardation which is a product ($\Delta n_{effect}\times d_{sw}$) of an effective refractive index anisotropy $\Delta n_{effect}$ and $d_{sw}$.

The value $\Delta n_{effect}$ coincides with a refractive index anisotropy $\Delta n$ inherent to the liquid crystal molecules if all the liquid crystal molecules are completely inverted only on a plane parallel to the substrates. However, in the case where the liquid crystal molecules cause inversion switching on their virtual cones based on the Goldstone mode, the resultant $\Delta n_{effect}$ presumably becomes smaller than the value $\Delta n$ (inherent to the liquid crystal molecules) by a degree corresponding to an angle rising from the substrate surface.

As described above, since the transient retardation R3 and the switching angle $\psi$ are both a function of applied voltage (V) and time (t), the relationships R3=R3 (V, t) and $\psi=\psi(V, t)$ hold.

Thus, an average transmitted light quantity (intensity) Tr (V) under application of a voltage (V) in one frame period is represented by the following equation (D);

$$Tr(V) = \frac{1}{T}\int_T^{c+T}\{T3\}dt = \frac{1}{T}\int_T^{c+T}\{\sin^2(2\times\psi(V,t))\times\sin^2(R3(V,t)/\lambda\}dt, \quad (D)$$

wherein T denotes a (one) frame period when a backlight for a transmission-type liquid crystal device is turned on through the entire frame period. This definition is also held in the case of, e.g., the device of the above-mentioned earlier-filed U.S. patent application Ser. No. 09/1338426, wherein one frame period is divided into a plurality of field periods. On the other hand, when the backlight is partially turned on and partially turned off in one frame period, the period T in the above equation (D) represents an illumination ("ON") period.

Based on the above equation (D), while taking into consideration a liquid crystal material used for the liquid crystal device and the above-mentioned factors $\xi$ and R3 depending on the alignment state of the liquid crystal material, it is possible to set an optimum cell gap so as to obtain a desired transmitted light quantity.

As described above, the retardation value at the time of drive of the liquid crystal device is a function of time (and voltage). When an average retardation in the above-mentioned frame period T is determined, a retardation affecting the transmitted light with respect to the transient retardation R3 described above should be calculated as a value of weighted average by taking the switching angle $\psi$ (similarly being a function of time (and voltage)) into consideration.

Accordingly, herein, the average retardation in the frame period T described above (hereinbelow, sometimes referred to as "(effecting average) retardation under voltage application") is defined by the following equation (E):

$$\overline{R}^{(V)} = \frac{\int_t^{F+1}\{\sin^2(2\times\psi(V,t))\times R3(V,t)\}dt}{\int_t^{F+1}\{\sin^2(2\times\psi(V,t))\}dt}. \quad (E)$$

Measurement of Transitional Retardation R3 and Switching Angle $\psi$.

As described above, the transitional retardation R3 and the switching angle $\psi$ of the liquid crystal molecules in the bulk state are functions of time. Accordingly, in the present invention, it is necessary to measure these values (R3 and $\psi$ in real time. However, it is difficult to measure these values in real time according to conventional methods such as the Senarmont method or the Berek method.

Based on the above-described alignment state of liquid crystal molecules when a liquid crystal device is supplied with voltage, the liquid crystal layer is divided into a boundary liquid crystal layer not contributing to the polarization plane rotation of incident polarized light in the vicinity of the boundaries with the substrates and a bulk liquid crystal layer contributing to the polarization plane rotation Accordingly, it is conceivable that it becomes possible to measure the retardation R3 and the switching angle ψ by the use of a specific phase compensator. Specifically, a phase compensator having a retardation value identical to that of the bulk liquid crystal layer is prepared and set to the liquid crystal device so that its optical axis is arranged perpendicular to the alignment direction (average molecular axis) of the liquid crystal molecules (within the bulk liquid crystal layer). That is, when the molecular alignment direction and the optical axis completely intersect each other at right angles, the retardation of the bulk liquid crystal layer is compensated by the phase compensator to provide a retardation of zero, thus not causing the rotation of the polarization plane. At that time, the liquid crystal molecules may be considered to be placed in an alignment state providing a transmitted light quantity in no voltage application state, i.e., the darkest state.

In this case, a switching angle of the bulk liquid crystal layer can be determined by measuring the set angle of the phase compensator. Further, such a measurement is performed by using an oscilloscope to obtain an angle providing the darkest state at an arbitrary time, thus determining a transient switching angle in real time.

In place of the liquid crystal device provided with the above-mentioned phase compensator, it is possible to use a nematic liquid crystal cell (device) of an electrically controlled birefringence (ECB) mode.

In this ECB-mode nematic liquid crystal cell, it is possible to change a retardation value by changing a voltage applied to the nematic liquid crystal cell. When conditions for providing the darkest state are determined while effecting control of the set angle and the applied voltage in combination, it becomes possible to obtain a retardation and a switching time at the same time.

The applied voltage and retardation for the nematic liquid crystal cell can be measured by using the Senarmont or Berek compensator. When such a measurement is effected in arbitrary time by using an oscilloscope to obtain conditions for providing the darkest state, it becomes possible to simultaneously determine real-time transient switching angle and retardation.

As a result, a liquid crystal device is designed to provide an optimum cell gap (liquid crystal layer thickness) obtainable according to the above-mentioned equation (D) to obtain a desired light-transmission characteristic.

In the present invention, such an optimum cell gap for a liquid crystal (e.g., the liquid crystal device 70 described above as shown in FIG. 1) may preferably be set to a value different from a cell gap value providing the optimum retardation as a product of the cell gap value with a refractive index anisotropy ($\Delta n$) of the liquid crystal material used.

Specifically, in the above-mentioned liquid crystal device 70, an effective refractive index anisotropy ($\Delta n_{effect}$) under voltage application is smaller than the refractive index anisotropy ($\Delta n$) under no voltage application of the liquid crystal 85.

Accordingly, the cell gap of the liquid crystal device 70 may desirably be set to a value larger than the cell gap value designed based on the optimum retardation ($\Delta nd$). An effective retardation value under voltage application is 0.8 times that under no voltage application. Thus, in the present invention, the cell gap is determined so that the effective retardation value under voltage application is in the optimum retardation (range) described below.

Herein, the term "optimum retardation" means a value (of $\Delta nd$) satisfying $\Delta nd/\lambda = \frac{1}{2}$ ($\lambda$: incident light wavelength) when the liquid crystal device 70 is used as a transmission-type liquid crystal device in combination with a pair of cross-nicol polarizers, thus varying depending on the wavelength ($\lambda$).

According to our experiment, when using the liquid crystal device 70 as a color liquid crystal device, a central wavelength to be optimized is in a range of 400–480 nm in view of, e.g., color temperature for white display state, thus resulting in an optimum retardation range of 200–240 nm.

Thus, in the above embodiment, the cell gap (d) of the liquid crystal device is designed so as to provide a product ($\Delta nd$) of the cell gap (d) and the refractive index anisotropy ($\Delta n$) of the liquid crystal material used, which is larger than an upper limit value (240 nm) of the optimum retardation range (200–240 nm) in the above embodiment.

As described above, in the case of a chiral smectic liquid crystal device using a liquid crystal material assuming a monostabilized state under no voltage application, a retardation at the time of voltage application is smaller than that under no voltage application.

In this case, when the liquid crystal device is arranged to provide the black (darkest) state under no voltage application, the liquid crystal device is designed to provide a retardation under no voltage application larger than an optimum retardation for the liquid crystal device.

By designing the liquid crystal device so as to provide the retardation under no voltage application, i.e., the product of the refractive index anisotropy $\Delta n$ and the cell gap d, larger than a corresponding optimum retardation, it is possible to obtain a desired (high) transmitted light quantity.

Referring again to FIG. 1, the liquid crystal material 85 may be placed in an alignment state such that the liquid crystal molecules are aligned to provide an average molecular axis to be monostabilized in the absence of an electric field applied thereto and, under application of voltages of one polarity (a first polarity), are realigned to provide a tilting angle which varies continuously from the average molecular axis of the monostabilized position depending on the magnitude of the applied voltage. On the other hand, under application of voltages of the other polarity (i.e., a second polarity opposite to the first polarity), the liquid crystal molecules are tilted from the average molecular axis under no electric field depending on the magnitude of the applied voltages. Further, in this embodiment a maximum tilting angle $\beta 1$, obtained under application of the first polarity voltages, is substantially equal to a maximum tilting angle $\beta 2$, formed under application of the first polarity voltages, i.e., $\beta 1 = \beta 2$.

The liquid crystal material 85 showing such a relationship ($\beta 1 = \beta 2$) between the maximum tilting angles $\beta 1$ and $\beta 2$ may preferably be a composition prepared by appropriately blending a plurality of liquid crystal materials exhibiting, e.g., the above-described characteristics (in terms of a cone angle inherent to a liquid crystal material used, a smectic layer spacing and a layer inclination angle) selected from hydrocarbon-type liquid crystal materials containing a biphenyl, phenyl-cyclohexane ester or phenyl-pyrimidine skeleton; naphthalene-type liquid crystal materials; and fluorine-containing liquid crystal materials.

The liquid crystal material providing the relationship: $\beta 1 = \beta 2$ is characterized by the following features (a)–(d):

(a) a layer inclination angle δ (an angle formed between smectic molecular layers having a chevron structure and a normal to the substrates) is substantially identical to or larger than a tilt (cone) angle Ⓗ (half of an apex angle of a virtual cone) of the liquid crystal material in SmC* at a temperature range including at least an operation temperature, (b) a layer inclination angle δ at least at an operation temperature is larger than a layer inclination angle calculated based on a temperature-dependent characteristic of a molecular layer spacing in a bulk state of the chiral smectic liquid crystal material, (c) a layer inclination angle δ for a chevron structure with a liquid crystal device changed by subjecting the device to an electric field (voltage) application treatment and/or a pressure application treatment is larger than a layer inclination angle $\delta_0$ for an initial chevron structure formed through cooling from an isotropic liquid phase temperature, and (d) a helical pitch in a bulk state of liquid crystal molecules is at least two times a cell gap.

Further, the liquid crystal material may preferably be subjected to the following treatments (i), (ii) and (iii):

(i) an electric field application treatment in Ch, SmA or SmC* for the liquid crystal material showing the phase transition series of Iso—Ch—SmA—SmC*, (ii) a pressure application treatment in SmA or SmC* for the liquid crystal material showing the phase transition series of Iso—Ch—SmA—SmC*, and (iii) an electric field application treatment in Ch or SmC* for the liquid crystal material showing the phase transition series of Iso—Ch—SmC*.

Hereinbelow, the present invention will be described more specifically based on Examples and Comparative Examples.

EXAMPLE 1

A blank cell was prepared in the following manner.

A pair of 1.1 mm-thick glass substrates, each provided with a 700 Å-thick transparent electrode of ITO film, was provided.

On each of the transparent electrodes (of the pair of glass substrates), a polyimide precursor for forming a polyimide having a recurring unit (PI-a) shown below was applied by spin coating and pre-dried at 80° C. for 5 minutes, followed by hot-baking at 200° C. for 1 hour to obtain a 200 Å-thick polyimide film.

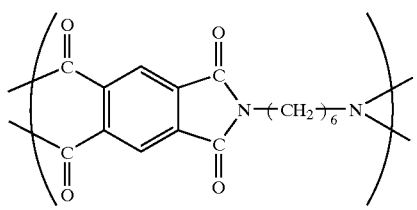
(PI-a)

Each of the thus-obtained polyimide films was subjected to rubbing treatment (as a uniaxial aligning treatment) with a nylon cloth under the following conditions to provide an alignment control film.

Rubbing roller: a 10 cm-dia. roller about which a nylon cloth ("NF-77", mfd. by Teijin K.K.) was wound Pressing depth: 0.3 mm Substrate feed rate: 10 cm/sec Rotation speed: 1000 rpm Substrate feed: 4 times Then, on one of the substrates, silica beads (average particle size=1.6 μm) were dispersed, and the pair of substrates were applied to each other so that the rubbing treating axes were in parallel with each other but oppositely directed (anti-parallel relationship), thus preparing a blank cell (single-pixel test cell) with a uniform cell gap.

A liquid crystal composition LC-1 was prepared by blending the following mesomorphic (liquid crystal) compounds in the indicated proportions.

| Structural Formula | wt. parts |
|---|---|
| $C_6H_{13}$—[pyrimidine]—[phenyl]—$OC_{10}H_{21}$ | 17 |
| $C_{10}H_{21}$—[pyrimidine]—[phenyl]—$OC_8H_{17}$ | 17 |
| $C_8H_{17}$—[pyrimidine]—[phenyl]—$OCC_7H_{15}$ (=O) | 11.3 |
| $C_8H_{17}$—[pyrimidine]—[phenyl]—$OCC_6H_{13}$ (=O) | 11.3 |
| $C_9H_{19}$—[pyrimidine]—[phenyl]—$OCC_7H_{15}$ (=O) | 11.3 |
| $C_{11}H_{23}$—[pyrimidine]—[phenyl]—$OC(=O)$—[thiophene]—$C_4H_9$ | 30 |
| $C_{10}H_{21}$—[pyrimidine]—[phenyl]—$OCH_2CHC_8H_{17}$ (F, *) | 2 |

The thus-prepared liquid crystal composition LC-1 showed the following phase transition series and physical properties.

Phase Transition Temperature (° C.)

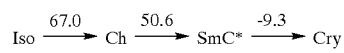

(Iso: isotropic phase, Ch: cholesteric phase, SmC*: chiral smectic C phase, Cry: crystal phase)

Spontaneous polarization (Ps): 1.2 nC/cm² (30°C.)

Cone angle (H): 24.1 degrees (30° C.)

Refractive index anisotropy Δn: 0.173 (30° C.)

Helical pitch (SmC*): at least 20 μm (30° C.)

The liquid crystal composition LC-1 was injected into the above-prepared blank cell in its isotropic liquid state and gradually cooled to a temperature providing chiral smectic C phase to prepare a liquid crystal device (single-pixel test cell) A.

In the above cooling step from Iso to SmC*, the device A was subjected to a voltage application treatment such that a DC (offset) voltage of −5 volts was applied in a temperature range of Tc±2° C. (Tc: Ch—SmC* phase transition temperature) while cooling each device at a rate of 1° C./minute.

The thus-prepared liquid crystal device A was evaluated in the following manner in terms of alignment state and optical response characteristics for triangular wave and rectangular wave and retardation, respectively.

Alignment State

The alignment state of the liquid crystal composition LC-1 of the liquid crystal device A was observed through a polarizing microscope at 30° C. (room temperature).

As a result, a substantially uniform alignment state such that under no voltage application, the darkest (optical) axis was somewhat deviated from the rubbing direction, and only one layer normal direction was present over the entire cell (liquid crystal device A).

Optical Response to Triangular Wave

The liquid crystal device A was set in a polarizing microscope equipped with a photomultiplier under cross-nicol relationship so that a polarizing axis was disposed to provide the darkest state under no voltage application.

When the liquid crystal device A was supplied with a triangular wave (±5 volts, 0.2 Hz) at 30° C., a resultant transmitted light quantity (transmittance) was gradually increased with the magnitude (absolute value) of the applied voltage under application of the positive polarity voltage. On the other hand, under application of the negative polarity voltage, a resultant transmitted light quantity was changed with the applied voltage level, but a maximum value of the transmittance was about 1/10 of a maximum transmittance in the case of the positive polarity voltage application.

Optical Response to Rectangular Wave

The optical response was evaluated in the same manner as in the above case of using the triangular wave except for using a rectangular wave (±5 volts, 60 Hz) in place of the triangular wave.

As a result, under application of the positive polarity voltage, the liquid crystal composition LC-1 was found to exhibit a sufficient optical response thereto and provide a stable halftone state independent of a previous state. Further, also under application of the negative polarity voltage, an optical response (in terms of transmittance) was confirmed similarly as in the case of the positive polarity application, but the value thereof was about 1/10 of that in the case of the positive polarity voltage application when compared at an identical absolute value of the voltages. It was also confirmed that an average value of the resultant transmittance did not depend on that in their previous states, thus attaining a good halftone image display.

Retardation

The liquid crystal device A was subjected to measurement of retardation under no voltage application and under application of a rectangular wave (AC waveform) of 60 Hz and ±5 volts, respectively.

The retardation under no voltage application ($R_{v=0}$) was measured by using the Berk compensator.

On the other hand, the (average) effective retardation under voltage ion (application of the rectangular wave) ($\overline{R}(V)$) of the equation (E)) was measured according to the above-mentioned measuring method (for the transient retardation and switching angle).

As a result, the liquid crystal device A provided a retardation ($R_{v=0}$) of 275 nm and an effective (average) retardation ($\overline{R}V$)) of 230 nm, which was in the retardation range of 200–240 nm.

COMPARATIVE EXAMPLE 1

A comparative liquid crystal device B was prepared and evaluated in the same manner as in Example 1 except for changing the average particle size (1.6 μm) of the silica beads (as a spacer) to 1.3 μm.

As a result, the comparative liquid crystal device B provided a retardation ($R_{v=0}$) of 225 nm and an average retardation ($\overline{R}(V)$) of 190 nm.

Then, two transmission-type liquid crystal apparatuses A and B were prepared using the liquid crystal device A and the comparative liquid crystal device B, respectively, and were subjected to relative evaluation in terms of brightness and (color) tint, respectively.

The results are shown in Table 1.

TABLE 1

| Device | Brightness | Tint |
|--------|------------|------|
| A | somewhat dark | somewhat bluish |
| B | bright | white |

As apparent from the results of Table 1, it was found that a desired transmitted light quantity was obtained by setting the cell gap (d) so as to provide the effective retardation ($R(V)$) under voltage application falling under the optimum retardation range (200–240 nm).

In the present invention, in the case where the liquid crystal device (e.g., the liquid crystal device A prepared in Example 1) is used in a reflection-type liquid crystal apparatus, the cell gap (d) may be appropriately changed so that the resultant effective retardation ($R(V)$) is in an optimum retardation range of 100–120 nm Further, in the present invention, the above-mentioned retardation relationships ($R(V)$)=200–240 nm for the transmission-type liquid crystal apparatus and $R(V)$= 100–120 nm for the reflection-type liquid crystal apparatus) may be satisfied by appropriately changing species and proportions of liquid crystal materials (compositions) used, i.e., a refractive index anisotropy (Δn) of the liquid crystal material per se.

EXAMPLE 2

A blank cell was prepared in the following manner.

A pair of 1.1 nm-thick glass substrates, each provided with a 700 Å-thick ITO film as a transparent electrode, was provided.

On each of the transparent electrodes, a polyimide precursor for forming a polyimide having a recurring unit (PI-a) shown below was applied by spin coating and pre-dried at 80° C. for 5 minutes, followed by hot-baking at 200° C. for 1 hour to obtain a 50 Å-thick polyimide film.

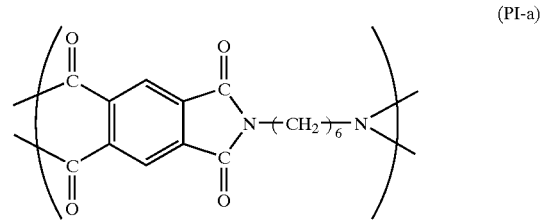
(PI-a)

Each of the thus-obtained polyimide films was subjected to rubbing treatment (as a uniaxial aligning treatment) with a nylon cloth under the following conditions to provide an alignment control film.

Rubbing roller: a 10 cm-dia. roller about which a nylon cloth ("NF-77", mfd. by Teijin K.K.) was wound Pressing depth: 0.3 mm
Substrate feed rate: 10 cm/sec
Rotation speed: 1000 rpm
Substrate feed: 4 times Then, on one of the substrates, silica beads (average particle size=1.7 μm) were dispersed, and the pair of substrates were applied to each other so that the rubbing treating axes were in parallel with each other and directed in the same direction, thus preparing a blank cell with a uniform cell gap.

When the blank cell was subjected to measurement of a pretilt angle α according to the crystal rotation method, the cell provided a pretilt angle α of 2.0 degrees.

A liquid crystal composition LC-2 was prepared by mixing the following compounds in the indicated proportions.

| Structural Formula | wt. parts |
|---|---|
| $C_6H_{13}$—[pyrimidine]—[phenyl]—$OC_{10}H_{21}$ | 49.5 |
| $C_8H_{17}$—[pyrimidine]—[phenyl]—$OCC_7H_{15}$ (C=O) | 16.5 |
| $C_8H_{17}$—[pyrimidine]—[phenyl]—$OCC_6H_{13}$ (C=O) | 16.5 |
| $C_9H_{19}$—[pyrimidine]—[phenyl]—$OCC_7H_{15}$ (C=O) | 16.5 |
| $C_{10}H_{21}$—[pyrimidine]—[phenyl]—$OCH_2\overset{*}{C}HC_8H_{17}$ (F) | 1 |

The thus-prepared liquid crystal composition LC-2 showed the following phase transition series and physical properties.

Phase Transition Temperature (° C.)

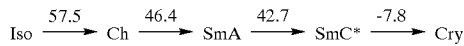

$$\text{Iso} \xrightarrow{57.5} \text{Ch} \xrightarrow{46.4} \text{SmA} \xrightarrow{42.7} \text{SmC}^* \xrightarrow{-7.8} \text{Cry}$$

(Iso: isotropic phase, Ch: cholesteric phase, SmA: smectic A phase, SmC*: chiral smectic C phase, and Cry: crystal phase)

Spontaneous polarization (Ps): 0.57 nC/cm² (30° C.)
Cone angle (H): 22.2 degrees (30° C.)
Refractive index anisotropy Δn: 0.157 (30° C.)
Helical pitch (SmC*): at least 20 μm (30° C.)

The liquid crystal composition LC-2 was injected into the above-prepared blank cell in its isotropic liquid state and gradually cooled to a temperature providing chiral smectic C phase to prepare a liquid crystal device C.

When the thus-prepared liquid crystal device C was subjected to observation of its initial alignment state at 30° C. through a polarizing microscope, the initial alignment state was found to be bistable states comprising two domains in mixture.

The liquid crystal device C was subjected to application of a rectangular wave (±50 volts, 10 Hz) for 5 minutes at 30° C. (electric field application treatment) and then observed through the polarizing microscope. As a result, the alignment state of the liquid crystal composition LC-2 was found to be changed from the bistable states (the mixture of two domains) to a uniform alignment state in which the darkest axis (an optical axis providing the darkest state) was aligned with the rubbing direction.

After the electric field application treatment, the liquid crystal device C was subjected to measurement of a transmittance (transmitted light quantity) by using a polarizing microscope provided with a photomultiplier while applying a triangular wave (voltage=0 to 15 volts, frequency=0.1 Hz) in a state such that a polarizing axis was aligned with the rubbing direction to provide the darkest state.

As a result, it was found that a domainless switching was performed to provide a voltage-transmittance curve (V-T curve) with no hysteresis including a V-shaped line having the darkest point (voltage (V)=0 volt, transmittance (T)=0%) as its center.

The V-T curve is shown in FIG. 10.

Figure 6:
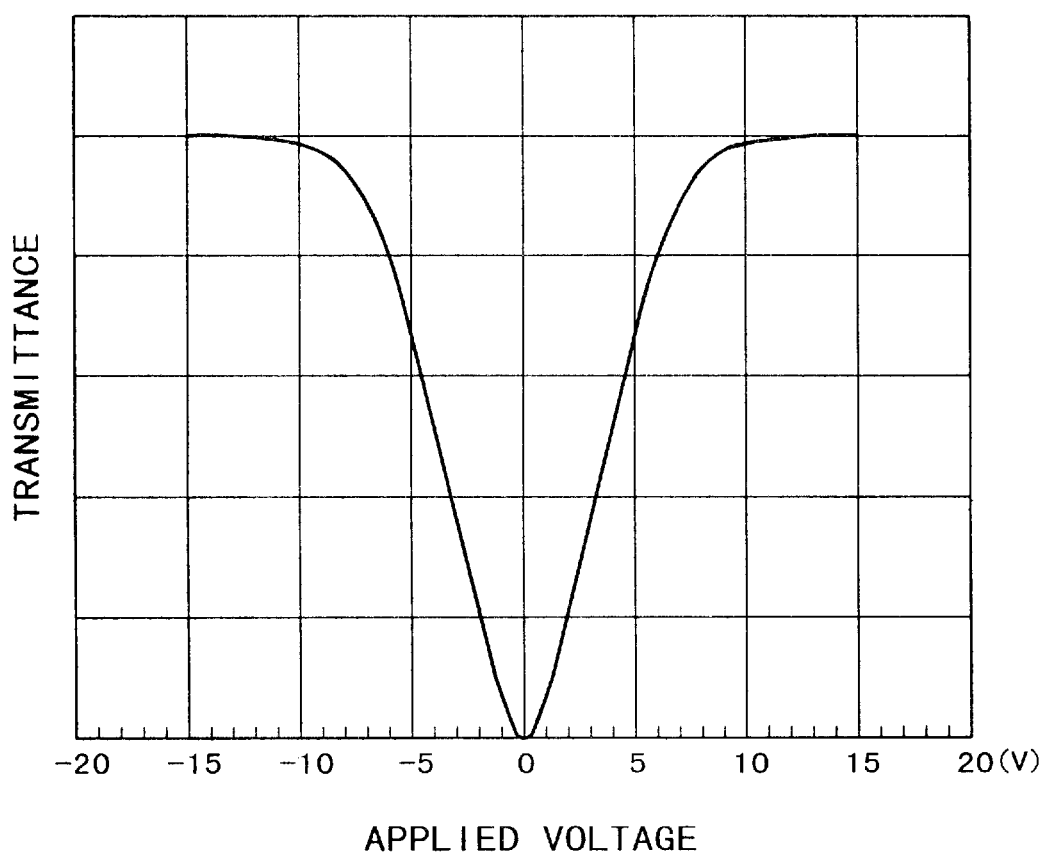

As shown in FIG. 6, the liquid crystal device C provided a saturation voltage (Vsat) giving a maximum transmittance of about ±10.0 volts.

Further, when the electric field (triangular wave) application was terminated, the molecular axis (original darkest axis) was returned to the original position. Accordingly, in the liquid crystal device C, it was found that the most stable molecular position was in a direction identical to the rubbing direction.

As apparent from the V-T curve shown in FIG. 6, the liquid crystal device C showed an optical response (transmittance) which continuously changed (increasing on both the positive voltage side and the negative voltage side) with an increase in applied voltage (as an absolute value), thus allowing an analog-like gradational display when modified into a TFT-type active matrix liquid crystal device and ill driven in an amplitude modulation manner.

The liquid crystal device C was subjected to measurement of retardations under no voltage application and under application of a rectangular wave (AC waveform) of 30 Hz and ±10 volts, respectively.

The retardation under no voltage application ($R_{v=0}$) was measured by using the Berek compensator.

On the other hand, the (average) retardation under voltage application (application of the rectangular wave) ($\overline{R}(V)$ of the equation (E)) was measured according to the above-mentioned measuring method (for the transient retardation and switching angle).

As a result, the liquid crystal device C provided a retardation ($R_{v=0}$ of 265 nm and an average retardation $\overline{R}(V)$) of 230 nm, which was in the optimum retardation range of 200–240 nm.

Comparative Example 2

A comparative liquid crystal device D was prepared and evaluated in the same manner as in Example 2 except for changing the average particle size (1.7 μm) of the silica beads (as a spacer) to 1.4 μm.

As a result, the comparative liquid crystal device D provided a retardation ($R_{v=0}$) of 220 run and an average retardation ($\overline{R}(V)$ of 195 nm.

Then, two transmission-type liquid crystal apparatuses C and D were prepared using the liquid crystal device C and the comparative liquid crystal device D, respectively, and were subjected to relative evaluation in terms of brightness and (color) tint, respectively.

The results are shown in Table 2.

TABLE 2

| Device | Brightness | Tint |
|---|---|---|
| C | somewhat dark | somewhat bluish |
| D | bright | white |

As apparent from the results of Table 2, it was found that a desired transmitted light quantity was obtained by setting the cell gap (d) so as to provide the effective average retardation (R(V)) under voltage application falling under the optimum retardation range (200–240 nm).

In the present invention, in the case where the liquid crystal device (e.g., the liquid crystal device D prepared in Example 2) is used in a reflection-type liquid crystal apparatus, the cell gap (d) may appropriately be changed so that the resultant effective retardation (R(V)) is in an optimum retardation range of 100–120 nm.

Further, in the present invention, the above-mentioned retardation relationships (R(V)=200–240 nm for the transmission-type liquid crystal apparatus and R(V)= 100–120 nm for the reflection-type liquid crystal apparatus) may be satisfied by appropriately changing species and proportions of liquid crystal materials (compositions) used, i.e., a refractive index anisotropy (Δn) of the liquid crystal material per se.

As described hereinabove, according to the present invention, by setting at least one of an refractive index anisotropy Δn and a layer thickness (cell gap) d of a chiral smectic liquid crystal material so as to provide an effective retardation (R (V)) under voltage application falling under an optimum retardation range (of the chiral smectic liquid crystal material) determined based on a transmitted light wavelength passing through a liquid crystal device in combination with an appropriate arrangement of at least one polarizer, it is possible to obtain a higher transmittance state even when using the liquid crystal material showing a chiral smectic phase.

What is claimed is:

1. A liquid crystal device comprising:
   a layer of a chiral smectic liquid crystal, a pair of substrates oppositely disposed to sandwich the liquid crystal and each provided with an electrode for applying a voltage to the liquid crystal, at least one of the substrates being provided with a uniaxial aligning axis for aligning the liquid crystal, and a polarizer disposed on at least one of the substrates,
   the liquid crystal being aligned to provide an average molecular axis to be placed in a monostable alignment state under no voltage application, is tilted from the monostable alignment state in one direction when supplied with a voltage of a polarity at a tilting angle which varies depending on magnitude of the supplied voltage, and
   the liquid crystal layer providing a retardation under no voltage application which is larger than an upper limit of an optimum retardation range determined based on an arrangement of the polarizer and a wavelength of light passing through the liquid crystal layer,
   wherein the polarizer is arranged to provide the darkest state under no voltage application.

2. A device according to claim 1, wherein the liquid crystal is aligned to provide an average molecular axis to be placed in a monostable alignment state under no voltage application, is tilted from the monostable alignment state in one direction when supplied with a voltage of a first polarity at a tilting angle which varies depending on magnitude of the supplied voltage, and is tilted from the monostable alignment state in the other direction when supplied with a voltage of a second polarity opposite to the first polarity at a tilting angle, said tilting angles providing maximum tilting angles $\beta 1$ and $\beta 2$ formed under application of the voltages of the first and second polarities, respectively, for satisfying $\beta 1 \geq 5 \times \beta 2$.

3. A device according to claim 1, wherein the liquid crystal has a helical pitch in its bulk state larger than a value two times a cell thickness of the liquid crystal device.

4. A transmission-type liquid crystal apparatus, comprising:
   a liquid crystal device according to claim 1,
   a drive circuit for driving the liquid crystal device, and
   a backlight for illuminating the liquid crystal device.

5. A device according to claim 1, wherein the liquid crystal layer provides a retardation under voltage application which is in the optimum retardation range.

6. A device according to claim 1, wherein the liquid crystal layer provides a retardation under voltage application which is smaller than that under no voltage application.

7. A liquid crystal device comprising:
   a layer of a chiral smectic liquid crystal, a pair of substrates oppositely disposed to sandwich the liquid crystal and each provided with an electrode for applying a voltage to the liquid crystal, at least one of the substrates being provided with a uniaxial aligning axis for aligning the liquid crystal, and a polarizer disposed on at least one of the substrates,
   the liquid crystal being aligned to provide an average molecular axis to be placed in a monostable alignment state under no voltage application, is tilted from the monostable alignment state in one direction when supplied with a voltage of a first polarity at a tilting angle which varies depending on magnitude of the supplied voltage, and is tilted from the monostable alignment state in the other direction when supplied with a voltage of a second polarity opposite to the first polarity at a tilting angle, said tilting angles providing maximum tilting angles $\beta 1$ and $\beta 2$ formed under application of the voltages of the first and second polarities, respectively, substantially satisfying $\beta 1 = \beta 2$, and
   the liquid crystal layer providing a retardation under no voltage application which is larger than an upper limit of an optimum retardation range determined based on an arrangement of the polarizer and a wavelength of light passing through the liquid crystal layer.

8. A device according to claim 7, wherein the liquid crystal is placed in an alignment state such that smectic molecular layers forming a chevron structure provide a layer inclination angle $\delta$ with a normal to the substrates and the liquid crystal provide a cone angle $\text{Ⓗ}$ in chiral smectic C phase, said angles $\delta$ and $\text{Ⓗ}$ satisfying the following relationship at at least an operating temperature:

$$\delta \geq \text{Ⓗ}.$$

9. A device according to claim 7, wherein the liquid crystal shows a phase transition series including isotropic phase (Iso), cholesteric phase (Ch), smectic A phase (SmA) and chiral smectic C phase (SmC*) on temperature decrease, and was subjected to an electric field application treatment in at least one of Ch, SmA and SmC*.

10. A device according to claim 7, wherein the liquid crystal has a helical pitch in its bulk state larger than a value two times a cell thickness of the liquid crystal device.

11. A transmission-type liquid crystal apparatus, comprising:
- a liquid crystal device according to claim 7,
- a drive circuit for driving the liquid crystal device, and
- a backlight for illuminating the liquid crystal device.

12. A liquid crystal device comprising:
- a layer of a chiral smectic liquid crystal, a pair of substrates oppositely disposed to sandwich the liquid crystal and each provided with an electrode for applying a voltage to the liquid crystal, at least one of the substrates being provided with a uniaxial aligning axis for aligning the liquid crystal, and a polarizer disposed on at least one of the substrates,
- the liquid crystal layer providing a retardation under no voltage application which is larger than an upper limit of an optimum retardation range determined based on an arrangement of the polarizer and a wavelength of light passing through the liquid crystal layer and the liquid crystal layer providing a retardation under voltage application which is smaller than that under no voltage application.

* * * * *

UNITED STATES PATENT AND TRADEMARK OFFICE
CERTIFICATE OF CORRECTION

PATENT NO. : 6,757,045 B1  Page 1 of 2
DATED : June 29, 2004
INVENTOR(S) : Yasufumi Asao et al.

It is certified that error appears in the above-identified patent and that said Letters Patent is hereby corrected as shown below:

Column 4,
Line 48, "82b" (first occurrence) should read -- 82a --.

Column 6,
Line 26, "thereof" should read -- thereof. --.

Column 7,
Line 54, "substituent" should read -- substituent; --.

Column 14,
Lines 14-15, "$\int_{T}^{c+T}$" (first occurrence) should read -- $\int_{\tau}^{\tau+T}$ -- and "$\int_{T}^{c+T}$" (second occurrence) should read -- $\int_{\tau}^{\tau+T}$ --.

Line 21, "09/1338426," should read -- 09/338426, --.
Lines 46-49, "$\overline{R}$(v)" should read -- $\overline{R}$(V) --; "$\int_{t}^{F+1}$" should read -- $\int_{\tau}^{\tau+T}$ -- and "$\int_{t}^{F+1}$" should read -- $\int_{\tau}^{\tau+T}$ --.

Line 56, "Ψ" should read -- Ψ) --.
Line 67, "rotation" should read -- rotation. --.

Column 16,
Line 3, "length (Δ)." should read -- length (λ). --.

Column 19,
Line 56, "ion" should read -- application --.

Column 20,
Line 30, "120 nm" should read -- 120 nm. --.
Line 42, "nm-thick" should read -- mm-thick --.

UNITED STATES PATENT AND TRADEMARK OFFICE
CERTIFICATE OF CORRECTION

PATENT NO.    : 6,757,045 B1
DATED         : June 29, 2004
INVENTOR(S)   : Yasufumi Asao et al.

It is certified that error appears in the above-identified patent and that said Letters Patent is hereby corrected as shown below:

Column 22,
Line 61, "220 run" should read -- 220 nm --.

Signed and Sealed this

Twenty-third Day of November, 2004

JON W. DUDAS
*Director of the United States Patent and Trademark Office*